(12) United States Patent
Coppage (10) Patent No.: US 7,729,484 B1
(45) Date of Patent: *Jun. 1, 2010

(54) SYSTEM AND METHOD FOR PROVIDING PREPAID COMMUNICATIONS

(75) Inventor: Carl M. Coppage, Harrisonville, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 1804 days.

This patent is subject to a terminal disclaimer.

(21) Appl. No.: 10/829,734

(22) Filed: Apr. 22, 2004

Related U.S. Application Data (63) Continuation of application No. 10/090,216, filed on Mar. 4, 2002, now Pat. No. 6,741,687.

(51) Int. Cl.
*H04M 15/00* (2006.01)
*H04M 11/00* (2006.01)

(52) U.S. Cl. .............................. 379/114.2; 379/114.01; 379/114.15; 379/114.17; 455/406

(58) Field of Classification Search ............ 379/114.01, 379/114.15–114.2; 455/405–408, 410, 411; 370/352

See application file for complete search history.

(56) References Cited

U.S. PATENT DOCUMENTS

| | | | |
|---|---|---|---|
| 5,828,740 A | 10/1998 | Khuc et al. | |
| 5,966,654 A | 10/1999 | Croughwell et al. | |
| 5,991,748 A | 11/1999 | Taskett | |
| 6,070,067 A * | 5/2000 | Nguyen et al. | 455/407 |
| 6,097,804 A | 8/2000 | Gilbert et al. | |
| 6,101,378 A | 8/2000 | Barabash et al. | |
| 6,137,869 A | 10/2000 | Voit et al. | |
| 6,188,752 B1 * | 2/2001 | Lesley | 379/114.16 |
| 6,393,289 B1 | 5/2002 | Bunting et al. | |
| 6,625,439 B2 * | 9/2003 | Laybourn et al. | 455/407 |
| 6,741,687 B1 * | 5/2004 | Coppage | 379/114.2 |
| 7,149,293 B1 * | 12/2006 | Coppage et al. | 379/114.2 |
| 2002/0046255 A1 | 4/2002 | Moore et al. | |
| 2002/0116338 A1 * | 8/2002 | Gonthier et al. | 705/52 |

FOREIGN PATENT DOCUMENTS

| | | |
|---|---|---|
| WO | WO98/21874 | 5/1998 |
| WO | WO99/56254 | 11/1999 |

* cited by examiner

*Primary Examiner*—Quoc D Tran (57) ABSTRACT

A method and system for network-based control over voice calling from a client telephony device. A client telephony device receives a user-request to place a voice call from the client telephony device and responsively sends to a controller, via a packet-data connection, a request for authorization to place the voice call. The client telephony device then receives from the controller, via the packet-data connection, a response to the request. And the client telephony device then sends to a network entity (e.g., a switch) a call origination request message seeking to initiate the voice call, only if the response from the controller indicates that the client telephony device is authorized to place the voice call. Further, the controller can also monitor a account balance for the client telephony device and direct the device to disconnect the call when the balance is exhausted.

20 Claims, 8 Drawing Sheets

SYSTEM AND METHOD FOR PROVIDING PREPAID COMMUNICATIONS

BACKGROUND

1. Field of the Invention

The present invention relates to telecommunications systems and, more particularly, to a method and system for providing account balance or prepaid communication service.

2. Description of Related Art

For many years, the telecommunications industry has recognized the need to provide a mechanism for restricting or otherwise managing use of communication services based on a measure of subscriber account balance. In systems providing account balance services, a subscriber may first establish a prepaid account with a service provider and then pay for a duration of communication services on the communication network by adding money to the prepaid account. An account balance typically represents a measure, such as time or monetary value, of communication services that a subscriber is authorized to use. As the subscriber uses the service, the carrier may then continuously monitor and decrement the balance of the prepaid account. When the balance drops to a low threshold level, the service provider may notify the subscriber and allow the subscriber to add more money to the account. Further, once the account is exhausted, i.e., the balance drops to zero, the service provider may refuse to provide additional services to the subscriber or charge the subscriber for an excess use. Other arrangements are also possible.

Offered for years in both landline and wireless systems, prepaid service has been viewed as a tool to attract "credit challenged" consumers, that is, potential customers with poor credit histories or who otherwise lack adequate credit references. In addition, prepaid services appeal to consumers who do not want to be burdened with contracts and bills, who want to maintain fixed budgets, or who simply wish to remain anonymous. For example, travelers who require a temporary phone service can benefit from prepaid services in the form of a rented wireless phone that has been activated with prepaid minutes. Similarly, a pre-activated wireless phone with initial prepaid minutes can be given, sold or rented through various channels, including supermarkets and convenience stores.

The concept of account balance services, however, encompasses more than just traditional prepaid communications. In general, an account balance service can involve establishing or applying any type of account balance that serves as an actual or suggested limit on use of communications services. The account balance could represent a time limit such as minutes of use, or a monetary limit such as dollars of use, for example. Further, the account balance that defines the actual or suggested limit on use need not necessarily come from a prepayment by a subscriber or other party. Rather, the account balance could simply represent an assigned limit on use, which the subscriber may or may not be allowed to exceed.

In order to provide account balance services, a telecommunications network should include some mechanism to track the start and stop of calls, to monitor and adjust a subscriber's balance during a call, and to maintain control in order to facilitate an appropriate response to a low or zero balance.

Figure 1:
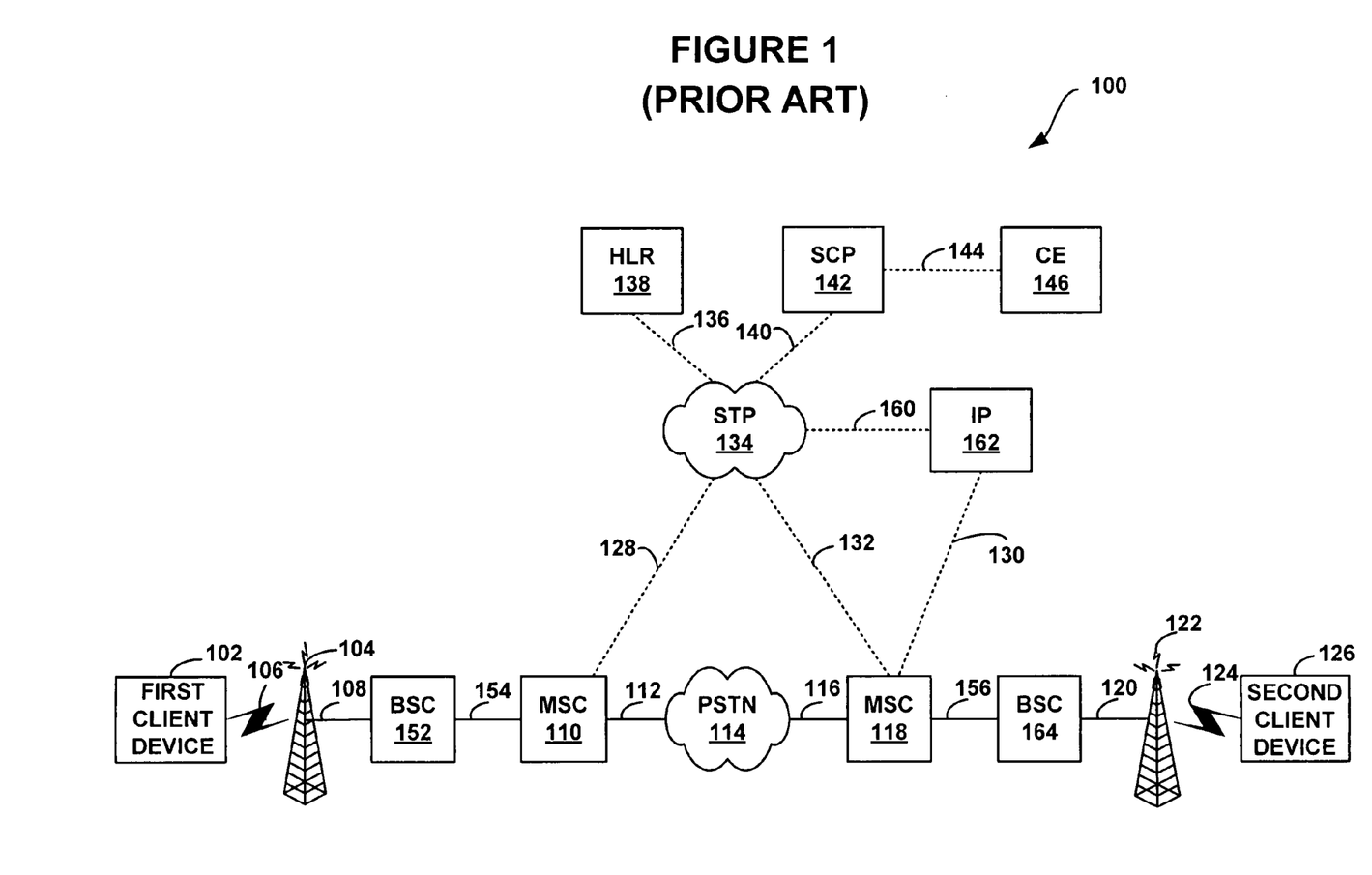
FIG. 1 is a block diagram illustrating a prior-art telecommunications network for prepaid calling.

FIG. 1 illustrates a wireless telecommunication network 100 in which account balance services are provided according to one existing embodiment. As shown in FIG. 1, network 100 includes a first client device 102, which communicates over an air interface 106, an intermediate base station 104, and a communication link 108 with a Base Station Controller ("BCS") 152. According to the embodiment illustrated in FIG. 1, first client device 102 may be a cellular telephone, for instance. BSC 152 is in turn coupled via a communication link 154 to a mobile switching center ("MSC") 110, which serves to connect calls between various points in network 100. As shown in FIG. 1, MSC 110 is connected by a voice data link 112 to a public switched telephone network ("PSTN") 114, which provides a path through which MSC 110 may connect calls with a remote MSC 118 and in turn with a second client device 126. MSC 118 is interconnected via a BSC 164 and an intermediate base station 122 to second client device 126.

Exemplary network 100 includes a signaling subsystem, which may be a packet-switched SS7 signaling system, for instance. At the core of the signaling network, there is a signal transfer point ("STP") backbone network 134, which may consist of one or more signal transfer points and associated signaling paths. STP network 134 carries out-of-band signals that are used to control the switches and to set up and tear down the circuit between the calling party, such as first client terminal 102, and the called party, such as second client terminal 126. As illustrated in FIG. 1, MSC 110 and MSC 118 are coupled to STP network 134 via signaling paths 128 and 132, respectively. For instance, Signaling System 7 ("SS7") may be used as a signaling system.

STP network 134 is coupled to a centralized service control point ("SCP") 142 via a signaling path 140. SCP 142 contains control information and call processing logic to assist MSC 110. For example, SCP 142 may provide routing instructions to MSC 110. In exemplary network architecture 100, an Intelligent Peripheral ("IP") 162 is coupled to STP 134 via a signaling path 160, and MSCs 110 and 118, or HLR 138 and SCP 142 may communicate with IP 162 via STP 134. IP 162 can be arranged to provide assorted services, including tone generation, voice recognition, playback, compression, call control, recording, and DTMF detection and collection. IP 162 may also include an intelligent voice response unit ("IVRU") to facilitate various interactions with users. In such an embodiment, IP 162 may be linked to one or more MSCs via one or more voice trunks, such as a voice trunk 130 illustrated in FIG. 130 for MSC 118. It should be understood that MSC 110 may have a voice trunk to the IP 162 as well. Typically, IP 162 does not have call control logic embedded and must be instructed to perform each operation under the control of SCP 142 using a Transmission Control Protocol/Internet Protocol ("TCP/IP"), for instance.

Exemplary network 100 further includes a Home Location Register ("HLR") 138 coupled by a signaling path 136 with STP network 134. HLR 138 serves standard functions in the wireless network such as managing service profiles and authenticating subscribers or mobile stations. HLR 138 may be located on an SCP operated by the home service provider of record for a given subscriber. In addition, network 100 may include a Visitor Location Register ("VLR"), which stores service profile information for mobile stations being served by the carrier-operating SCP 142.

To manage account balances, network 100 further includes a calculation engine ("CE") 146. Calculation engine 142 is a programmed computer running an application to manage subscriber account balances. In FIG. 1, CE 146 is coupled to SCP 142 via a link 144. Link 144 may be a wide area network such as the Internet, and SCP 142 and CE 146 may communicate over link 144 by a TCP/IP interface.

In one arrangement for providing account balance services, a prepaid subscriber may originate a call from first client device 102 by sending dialed digits to MSC 110. Upon receipt of the dialed digits, MSC 110 may request instructions from SCP 142 by sending to SCP 142 an origination request message including the dialed digits and a mobile station identifier of first client device 102. Upon receipt of the dialed digits, SCP 142 may determine that the subscriber is the account balance service subscriber, and, further, that IP 162 needs to play an announcement of the subscriber's available balance. Therefore, SCP 142 may request from IP 162 a routing number for routing the call from MSC 110 to IP 162. IP 162 may respond by allocating a temporary number to one of its ports and returning that number to SCP 142. SCP 142 may then send a message to MSC 110, instructing MSC 110 to set up a call to the allocated number at IP 162, and MSC 110 may then set up the call.

Once the call is set up between MSC 110 and IP 162, IP 162 may query SCP 142 for instructions, and SCP 142 may instruct IP 162 to play a balance announcement. EP 162 may then play the balance announcement to the user at first client device 102 and may inform SCP 142 it has done so. In turn, SCP 142 may send a disconnection request to MSC 110 instructing MSC 110 to disconnect from IP 162.

In such an embodiment, MSC 110 may then set up a call to a number dialed by the subscriber and, when the called party answers, MSC 110 may detect an answer trigger and responsively sends to SCP 142 a message indicating that the call was answered. Upon receipt of the message, SCP 142 may instruct CE 146 to begin decrementing the subscriber's account balance. In turn, when the call ends, MSC 110 may detect a disconnection trigger and responsively may send to SCP 142 a disconnection message to SCP 142 that responsively may instruct CE 146 to stop decrementing the subscriber's account balance.

This solution for providing account services is expensive, since it requires MSCs and SCPs to be configured with call triggers that trigger the MSCs and SCPs to interact with network entities providing account balance services, such as CE 146 and IP 162. Further, existing systems require costly overlay voice connectivity to the network entities providing account balance services (such as voice connectivity between MSC 110 and IP 162 explained above in greater detail) and, thus, consume voice connection resources by tying voice trunks available on network entities in the network.

Therefore, a need still exists for an improved system and methods for providing account balance services.

SUMMARY

The present invention relates to a method and system for providing prepaid supported communications.

One exemplary method includes establishing a control communication session between a first client device and a control network entity configured to provide prepaid services to the first client device, establishing a voice communication session between the first client device and a second client device, and using the control communication session to control the voice communication session.

These as well as other aspects of the present invention will become apparent to those of ordinary skill in the art by reading the following detailed description, with appropriate reference to the accompanying drawings.

BRIEF DESCRIPTION OF THE DRAWINGS

Exemplary embodiments of the present invention is described herein with reference to the drawings, in which.

DETAILED DESCRIPTION OF EXEMPLARY EMBODIMENTS

Figure 2:
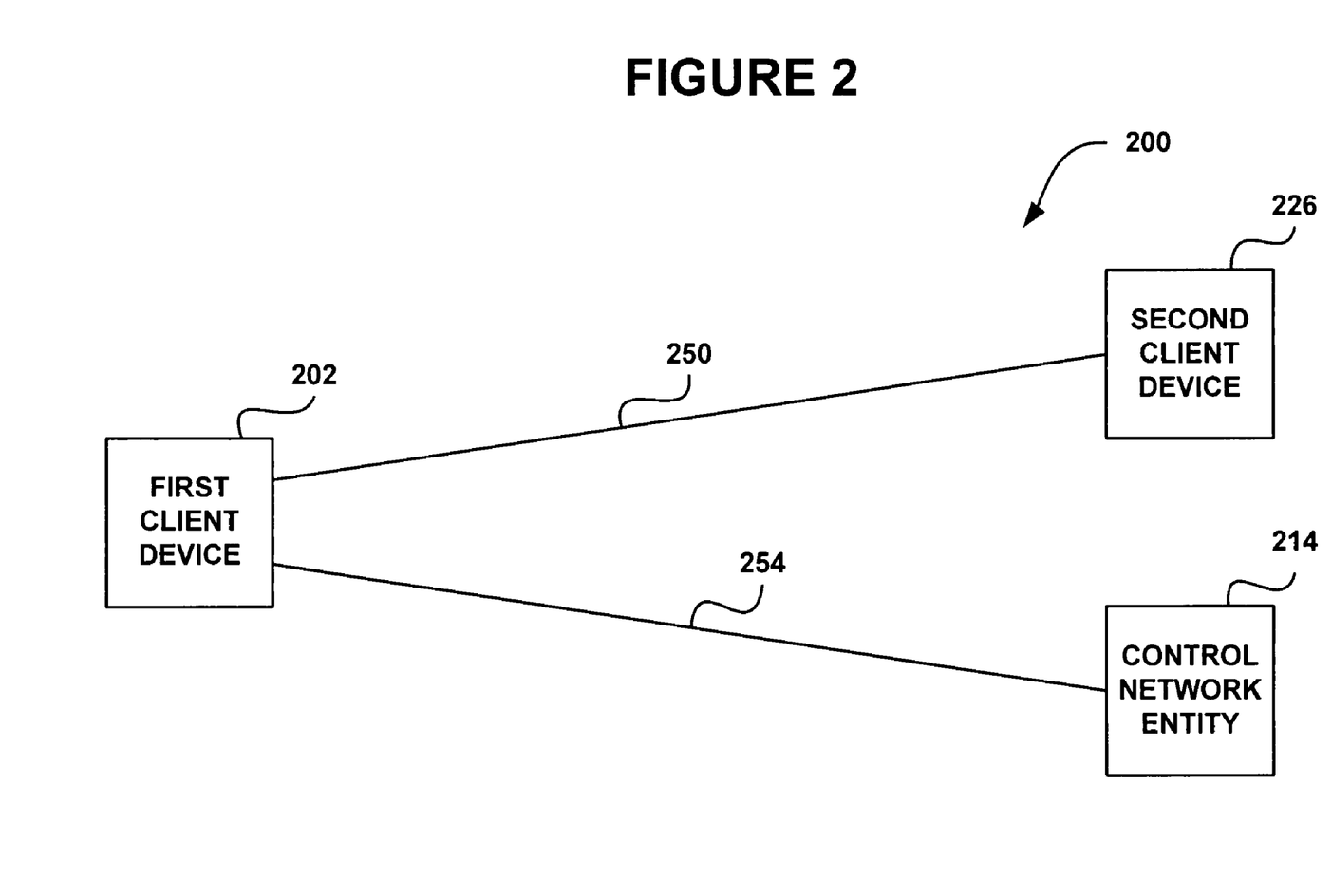
FIG. 2 is a block diagram illustrating a telecommunications network for prepaid calling according to the exemplary embodiments.

FIG. 2 illustrates a block diagram of a telecommunications network 200 in which exemplary embodiments for account balance calling can be employed. As shown in FIG. 2, network 200 includes a first client device 202 and a second client device 226. Client devices may take any suitable form, such as, for instance, a cellular or PCS telephone, a computer, a fax machine or a personal digital assistant ("PDA"). It should be understood that client devices 202 and 226 are not limited to wireless devices. According to an exemplary, first client device 202 and/or second client device 226 may include a third generation ("3G") mobile station capable of simultaneously engaging in voice and data sessions. Further, it should be understood that second client device 226 may be a wireline device as well.

Figure 3:
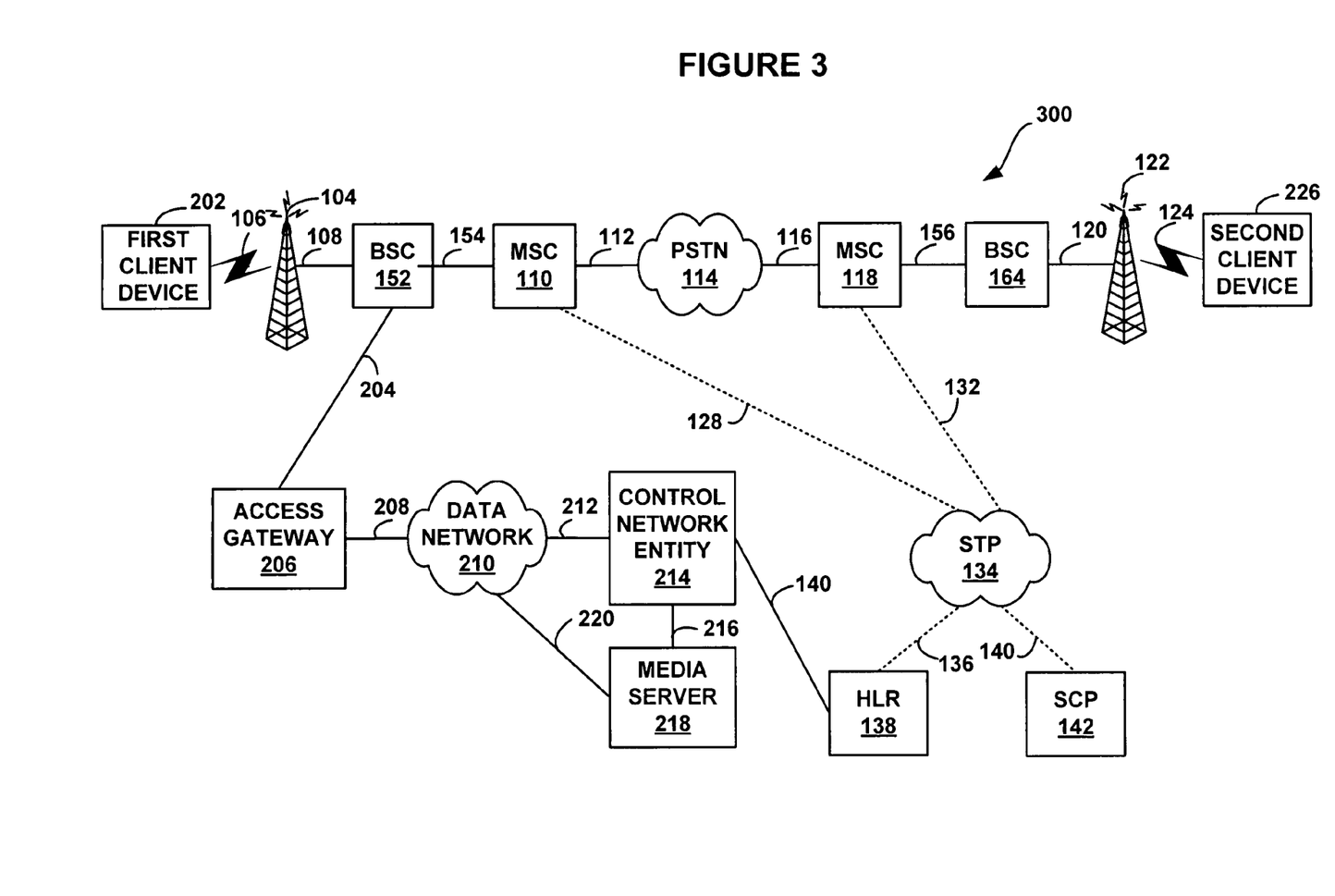
FIG. 3 is another block diagram illustrating a telecommunications network for prepaid calling according to the exemplary embodiments.

As shown in FIG. 3, first client device 202 communicates with second client device 226 via a voice communication session 250, and, further, with a prepaid control network entity 214 via a data communication session 254. First client device 202 may establish voice communication session 250 with second client device 226 (or second client device 226 may establish session 250 with first client device 202) via a PSTN or other network including a packet network using technologies such as Voice over IP. Further, data communication session 254 may be established via a carrier data network comprising a packet-data network such as an Internet or a different type of network such as a local area network ("LAN") or a wireless network, for instance. According to an exemplary embodiment, first client device 202 may employ data communication session 254 as a control communication session for controlling prepaid calls being placed from first client device 202. It should be understood that the present invention is not limited to calls being placed from first client device 202, and methods described hereinafter may be equally applicable to calls terminating at first client device 202, i.e., calls in which first client device 202 is a terminating client device rather than an originating client device.

FIG. 3 illustrates a detailed block diagram of a telecommunications network 300 in which exemplary embodiments for account balance calling can be employed between first client device 202 and second client device 226.

First client device 202 is coupled to a BSC 152 via intermediate base station 104 and links 106 and 108, and BSC 152 is in turn coupled to MSC 110 via communication link 154. MSC 110 is then shown coupled via communication link 112 to PSTN 114, which is then coupled to MSC 118 via communication link 116. MSC 118 is further coupled via communication link 156 with BSC 164 that is further interconnected to second client device 226 via intermediate base station 122 and communication links 120 and 124.

Exemplary network 300 further includes a signaling subsystem. The signaling subsystem includes STP network 134 interconnected to MSC 110, PSTN 114 and MSC 118 via signaling links 128 and 132, respectively. Further, STP network 134 is coupled to SCP 142 via signaling link 140 and to HLR 138 via signaling link 136. In this arrangement, BSC 152 can set up a voice communication session between client device 202 and client device 226 via MSC 110, PSTN 114, MSC 118, BSC 154 and base station 122.

As additionally shown in FIG. 3, network 300 further includes a data network subsystem including an access gateway entity 206, a data network 210, a control network entity 214 and a media server 218. Control network entity 214 may be a network server arranged to provide prepaid call services according to exemplary embodiments that will be described in greater detail below. Before sending any signaling messages to establish a voice communication session to second client device 226, first client device 202 establishes a control communication session to control network entity 214. As further illustrated in FIG. 3, first client device 202 may establish control communication session 254 via data network 210.

BSC 152 is also interconnected to data network 210 via a communication link 204, access gateway 206 and a communication link 208. Further, data network 210 is interconnected to control network entity 214 via a communication link 212, and, further, to media server 218 via a communication link 220. Alternatively, control network entity 214 and media server 218 may be configured as nodes on data network 210. Control network entity 214 is further interconnected to HLR 138 via a communication link 140. As illustrated in FIG. 3, control network entity 214 communicates directly with HLR 138; however, it should be understood that different embodiments are possible as well. For example, control network entity 214 may communicate with HLR 138 via a proxy server.

According to an exemplary embodiment, access gateway 206 enables first client device 202 to communicate via data network 210. In one embodiment, access gateway 206 may be a packet data serving node ("PDSN") that may route packets through BSC 152 and data network 210. In an embodiment where access gateway 206 is a PDSN, the PDSN may be further coupled to an authorization, authentication and accounting ("AAA") server (not shown). An AAA server may be employed to verify that a client device is authorized to communicate over data network 210 and, further, to authenticate a subscriber of the client device.

In one embodiment, communication links 204, 208, 212, 216 and 220 may include wire or fiber optic cable links, wireless communication links, or a combination thereof.

Figure 4:
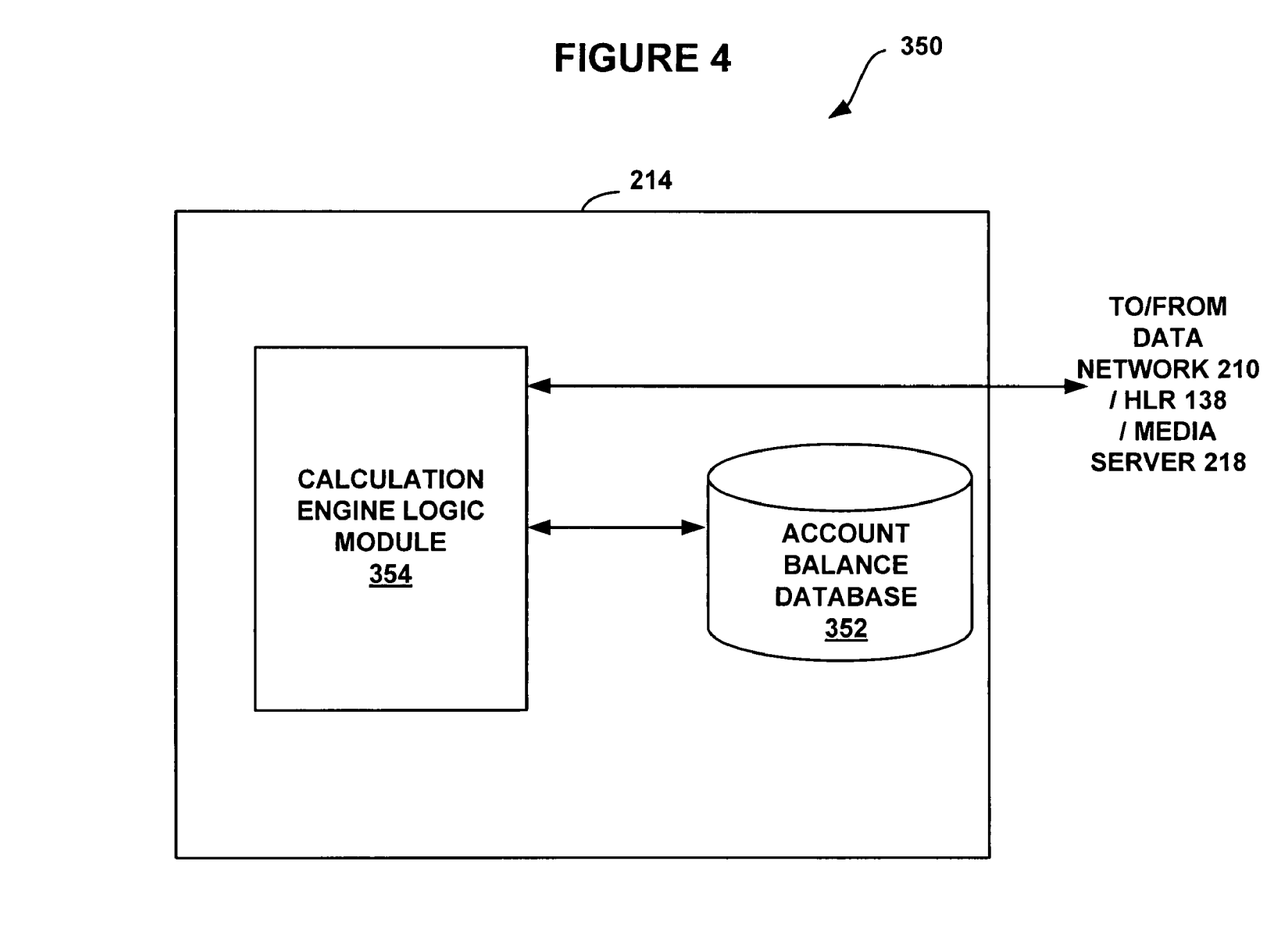
FIG. 4 is a block diagram of a control network entity that may be employed in the exemplary embodiments.

FIG. 4 is a block diagram illustrating exemplary control network entity 214 in greater detail. In an embodiment, where control network entity 214 tracks the balance of the prepaid account, control network entity 214 may include a calculation engine logic module 354 and an account balance database 352. It should be understood that the account balance database and calculation engine logic do not necessarily have to be located in the same network entity. Alternatively, the account balance database may instead be located in another network entity in network 200 and, in that case, the calculation engine 354 could access the account balance information through data network 210, a wireless communication link, a wired communication link, or a combination thereof.

According to an exemplary embodiment, media server 216 may be a streaming server. In such an embodiment, upon detecting a trigger (such as a message including instructions) from control network entity 214, media server 216 may play account balance announcements or send video/graphical messages to subscribers receiving account balance services. In one embodiment, media server 216 may set up a Real Time Transport Protocol ("RTP") session with one or more client devices involved in the communication sessions, and use the RTP session to play account balance announcements or to send messages to the subscribers of the client devices.

RTP is a real-time transport protocol that provides end-to-end delivery services to support applications transmitting real-time data, such as audio or video, over unicast or multicast network services. RTP services include payload type identification, sequence numbering, and time stamping, and data transmission is monitored by means of a closely integrated control protocol called Real Time Control Protocol ("RTCP") communications.

To set up an RTP session, an application may define a pair of destination transport addresses, such as a network address and a pair of ports for RTP and RTCP. For multimedia sessions, each medium may be carried in a separate RTP session having RTCP packets reporting reception quality for each session. For example, audio and video may be transmitted via different RTP sessions, enabling a recipient to select whether or not to receive a particular medium. It should be understood that different communication means between media server 218 and client devices could also be used. Further, it should be understood that more than one data session may be established from first client device 202 via data network 210.

Figure 5:
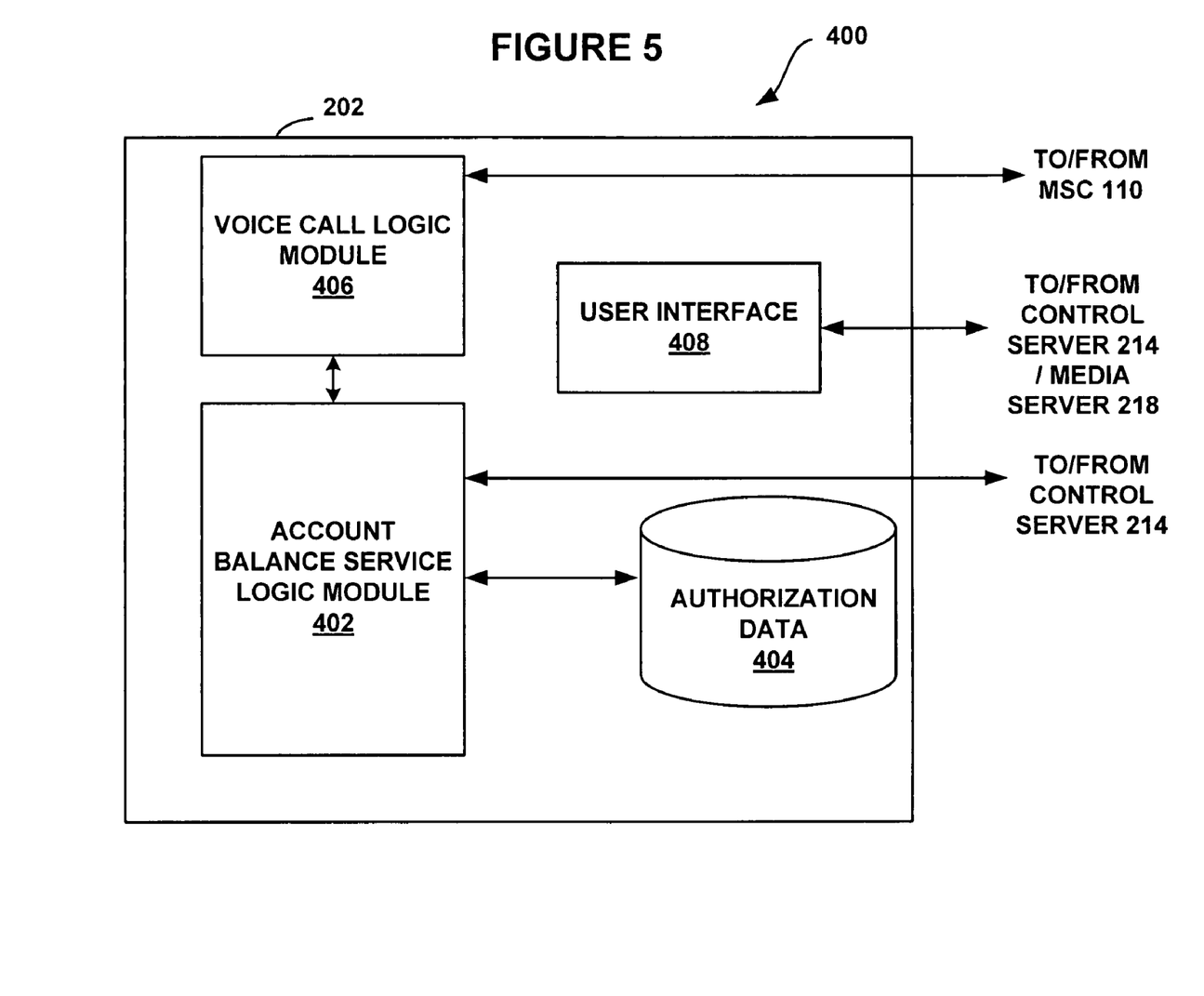
FIG. 5 is a block diagram of a client device that may be employed in the exemplary embodiments.

FIG. 5 is a block diagram illustrating exemplary first client device 202 in greater detail. As indicated above first client device 202 may be a wireless telephone such as a 3G wireless telephone capable of simultaneously engaging in voice and data communication sessions. As shown in FIG. 5, exemplary first client device 202 includes an account balance service logic application ("AB service logic module") 402, an authorization data storage 404, a user interface 408, and a voice call logic module 406. It should be understood that first client device 202 also includes a processor programmed to execute an appropriate set of instructions stored in a memory of first client device 202.

According to an exemplary embodiment, first client device 202 may be configured to automatically initiate a process for establishing a data session with data network 210 upon power-on. Alternatively, if first client device 202 is not configured to automatically establish a data session, first client device 202 may initially communicate with a predetermined network entity, such as an AAA server, that may authorize first client device 202 to access data network 210. In such an embodiment, authorization data storage 404 may store authorization and authentication information associated with first client device 202 and a subscriber. The authorization information may include a unique identifier associated with first client device 202, such as a mobile identification number ("MIN"), for instance.

If access gateway 206 is a PDSN, the PDSN may authorize first client device 202 to access data network 210. In such an embodiment, the authorization may require that first client device 202 register with a home agent and/or a foreign agent. The home agent and foreign agent may be software entities residing on the PDSN that exchange packets with first client device 202. For instance, first client device 202 may subscribe to a carrier that runs a home network. If first client device 202 is on the home network, then first client device 202 may contact its home agent and provide its MIN to the home agent to establish communications. Having the MIN, the home agent may query an AAA server using a Remote Authentication Dial-In User Service ("RADIUS") protocol, for instance, and the AAA server may verify whether first client device is authorized to access data network 210.

If first client device 202 is in a foreign network (i.e., run by a carrier to which first client device does not subscribe or a non-home network being served by the same carrier), the foreign agent may enable first client device 202 to register its presence at a remote location. As part of registration, first client device 202 may provide the foreign agent with a home address that uniquely identifies its home agent. First client device 202 may also provide the foreign agent with the MIN. Using the home address, the foreign agent may access the AAA server to determine if first client device 202 is authorized to communicate over data network 210.

In either embodiment, when first client device 202 is successfully authenticated, first client device 202 may establish a network connection to data network 210, and then may enter into a control communication session with control network entity 214. As illustrated in FIG. 4, AB service logic module 402 interacts with voice call logic module 406. In one exemplary embodiment, voice call logic module 406 may be configured to notify AB service logic module 402 upon detecting a call being initiated at first client device 202 or upon detecting a call being placed to first client device 202.

When AB service logic module 402 detects such a trigger from voice call logic module 406, AB service logic module 402 may send a prepaid status request to control network entity 214 via the control communication session that may be established upon a power on or upon detecting a call attempt to/from first client device 202. Responsive to receiving the prepaid status request, control network entity 214 may determine whether first client device 202 is authorized (i.e., whether first client device 202 has sufficient balance) to establish a voice communication session. Then, control network entity 214 may send a prepaid status response to first client device 202. The prepaid status response may include an authorization or rejection to establish the voice communication session.

Responsive to receiving the prepaid status response from control network entity 214 at first client device 202, AB service logic module 402 may determine if the response includes an authorization to establish the voice communication session. If the response includes an authorization, AB service logic module 402 may notify voice call logic module 406 that first client device 202 is authorized to establish the voice communication session. Voice call logic module 406 then allows the requested voice call to be established.

In turn, as will be described in greater detail below, AB service logic module 402 may communicate with control network entity 214 via the data communication session during the progress of the call. For instance, AB service logic module 402 may receive a call disconnect request from control network entity 214. When AB service logic module 402 receives a call disconnect request, AB service logic module 402 may notify voice call logic module 406 to disconnect the voice call.

Further, according to an exemplary embodiment, first client device 202 includes user interface 408 by which announcements can be played from media server 218 and via which the user can provide inputs that may be communicated to control server 214.

Figure 6:
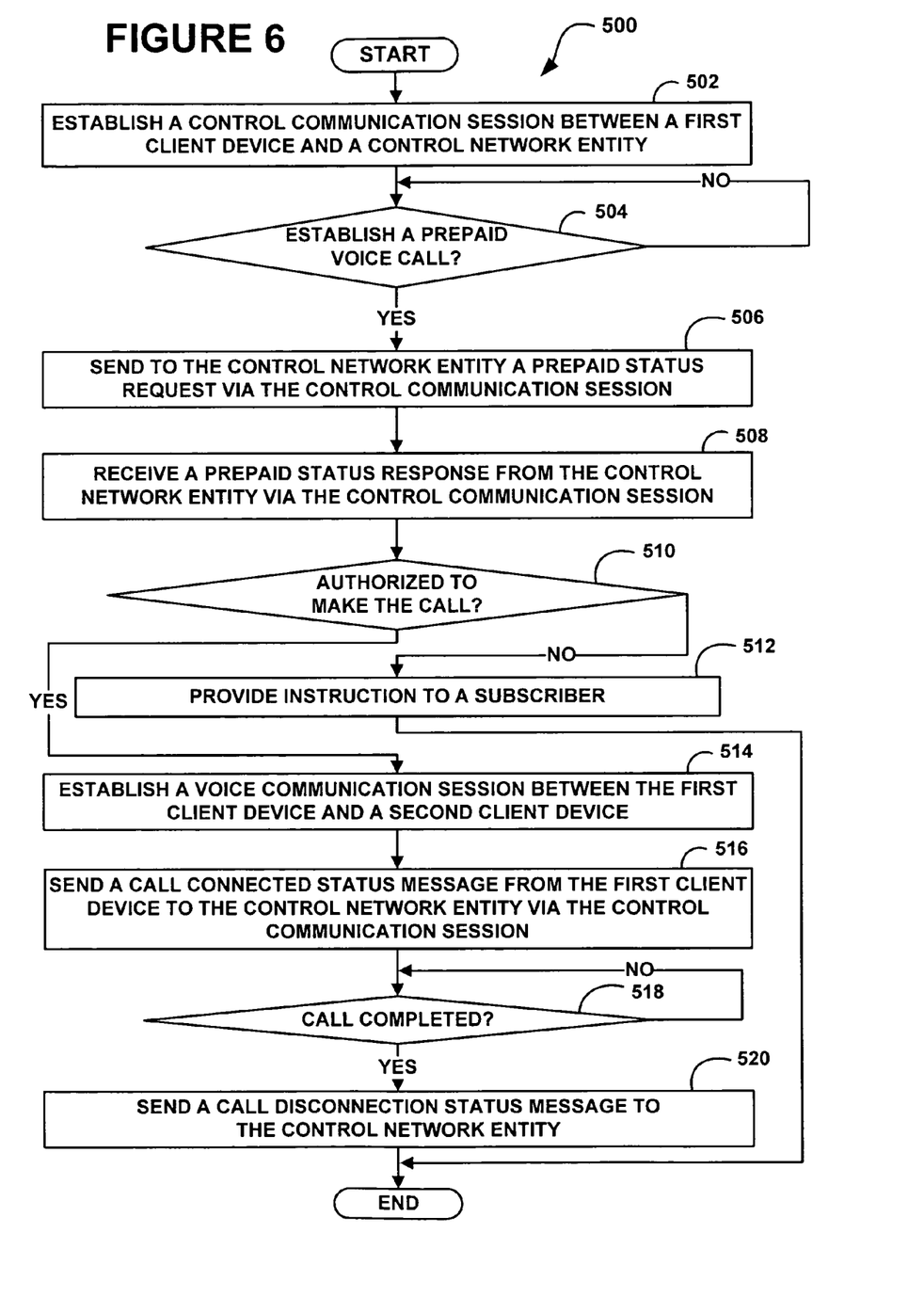
FIG. 6 is a flow chart illustrating a method for providing prepaid services for a client device, the method being executed on the client device according to the exemplary embodiments.

FIG. 6 is a flow chart illustrating a method 500 for providing prepaid services to a client device, the method being executed on the client device according to the exemplary embodiment. FIG. 6 specifically describes prepaid services. However, different account balance services could also be provided using the exemplary embodiments.

Beginning at step 502, a first client device establishes a control communication session to a control network entity. In one embodiment, illustrated in reference to FIGS. 2 and 3, the first client device may be first client device 202, and the control network entity may be control network entity 214. Further, according to an exemplary embodiment, the first client device may be configured to establish a network connection via a data network to the control network entity, and then enter into a control communication session with the control network entity via the network connection. As mentioned in reference to the preceding figures, the first client device may establish the control communication session upon a power-on. The first client device may establish the control communication session using an authentication process.

According to an exemplary embodiment, the first client device may include an account balance application arranged to provide account balance services according to an exemplary embodiment. At step 504, the account balance application on the first client device determines if a prepaid call request, i.e., a prepaid request to connect a call from the first client device to a second client device, is placed on the first client device. Alternatively, the call may be placed to the first client device. If the call is placed from the first client device, the call request may include dialed digits, such as a PSTN telephone number, a MIN identifier, or an IP address, associated with the second client device. According to one embodiment, the first client device may include a selection input associated with prepaid call services, and the subscriber may select the selection input to initiate a prepaid call. For example, the prepaid service input may include a graphical selection input, a physical selection input (such as a predetermined key on the client device), or a combination of both. Alternatively, the subscriber may be a prepaid calling subscriber, and all calls placed on the first client device may be processed according to the exemplary embodiments described in reference to method 500.

If the account balance application on the first client device detects a prepaid voice call request, at step 506, the account balance application on the first client device sends via the control communication session to the control network entity a prepaid status request message. According to an exemplary embodiment, the prepaid status request message includes a request for a current prepaid status associated with the originating subscriber. Additionally, the status request message may include the digits dialed by the originating subscriber.

At step 508, the first client device receives a prepaid status response from the control network entity via the control communication session. According to an exemplary embodiment, the prepaid status response may include authorization information related to providing prepaid services to the subscriber associated with the first client device. For example, the authorization information may include a measure of the subscriber's current balance. Additionally, or alternatively, the prepaid status response may include detailed information on decrement rates based on the type of call that the subscriber wishes to make from the first client device.

At step 510, the first client device determines whether the subscriber is authorized to make the prepaid call. To do that, according to an exemplary embodiment, the first client device uses the authorization information provided in the prepaid status response received from the control server.

If the prepaid status response includes an authorization rejection, at step 512, the first client device may receive instructions to be provided to the subscriber. In one embodiment, the instructions may be in a format of an audio, video or text message including instructions for the subscriber to add value to an existing prepaid account, for instance. In such an embodiment, the instructions may further include a request to redirect the subscriber to a predetermined network entity, such as a web server, arranged to enable the subscriber to update the subscriber's prepaid account. Alternatively, the first client device may be automatically redirected to the web server, and no information is provided to the subscriber prior to the redirection.

FIG. 6 illustrates that method 500 terminates after the first client device provides the instructions to the subscriber. However, it should be understood that, upon receiving the instructions, the subscriber may add value into the prepaid account by connecting to the predetermined network entity. If after the addition of the value, the subscriber is authorized to make the call, the first client device may receive from the control network entity an authorization message, and the first client device may initiate a process of connecting the call.

Referring back to step 510, if the first client device determines that the subscriber is authorized to make the call, at step 514, the first client device begins establishing a voice communication session between the first client device and the second client device. According to an exemplary embodiment, the first client device sends a request to a switching entity, and the call is set up to the second client device via a communication network, such as a PSTN. It should be understood that the first client device may also be a terminating client device, and method 500 is not limited to the first client device being an originating client device.

Upon establishing the call, at step 516, the first client device sends a call connected status message to the control network entity via the control communication session. Therefore, the control network entity can begin monitoring the subscriber's balance and, further, can notify the subscriber when the balance gets too low. Further, at step 518, the first client device monitors the progress of the call to determine when the call is disconnected. When the first client device detects that the call is disconnected at step 520, the first client device sends a call disconnect status message to the control network entity, and method 500 terminates. Additionally, according to an exemplary embodiment, during the progress of the call, the first client device may receive a notification message including, for example, a notification message informing the subscriber that the subscriber's prepaid balance is low. Further, the first client device may receive from the control network entity a call disconnect request including a request to disconnect the call between the first client device and the second client device. According to an exemplary embodiment, such a request may be sent responsive to detecting a low threshold level (such as a "zero" threshold level) of the subscriber's prepaid balance.

Figure 7A:
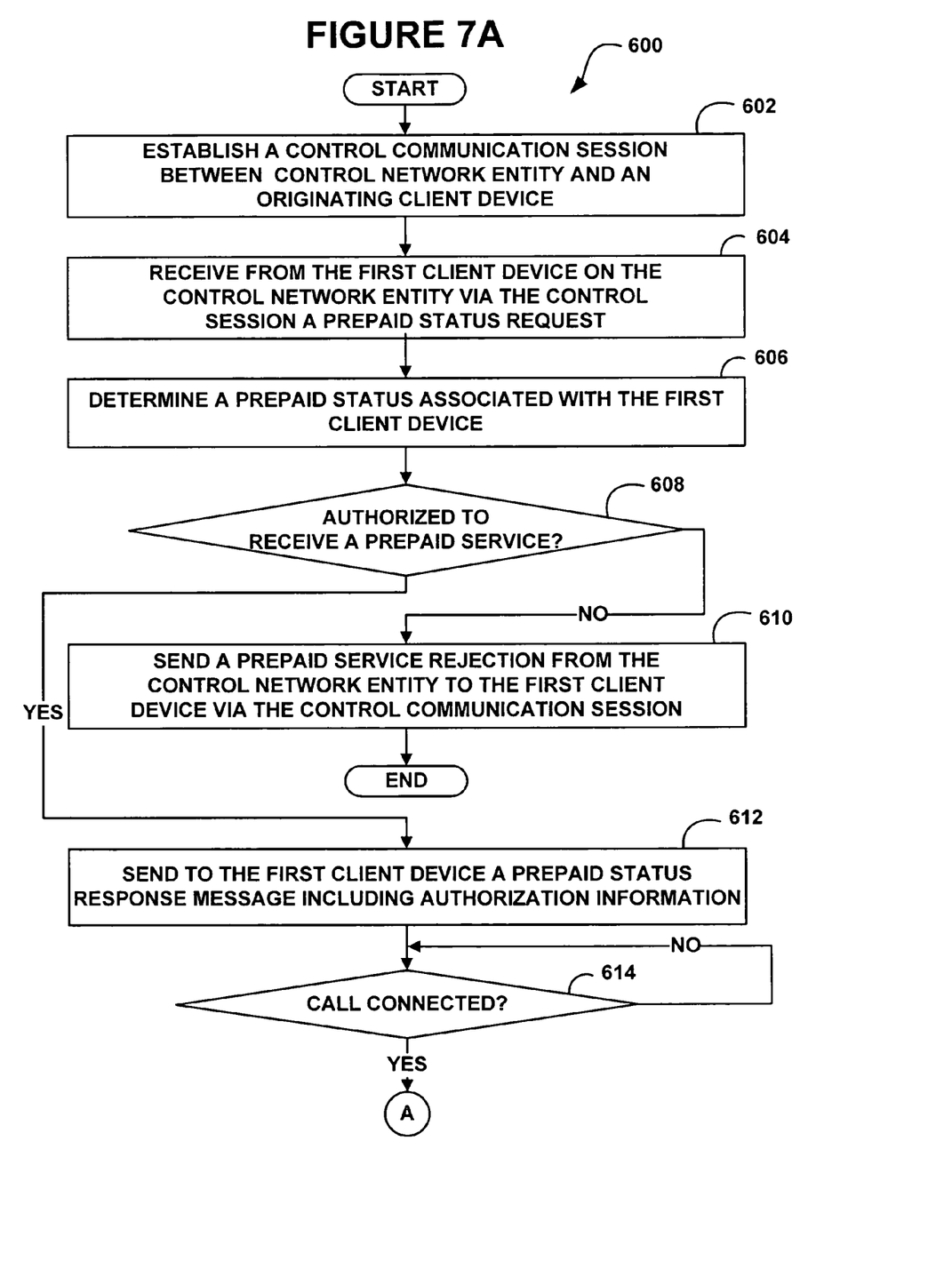
FIGS. 7A and 7B are a flow chart illustrating a method for providing prepaid services for a client device, the method being executed on a control network entity according to the exemplary embodiments.
Figure 7B:
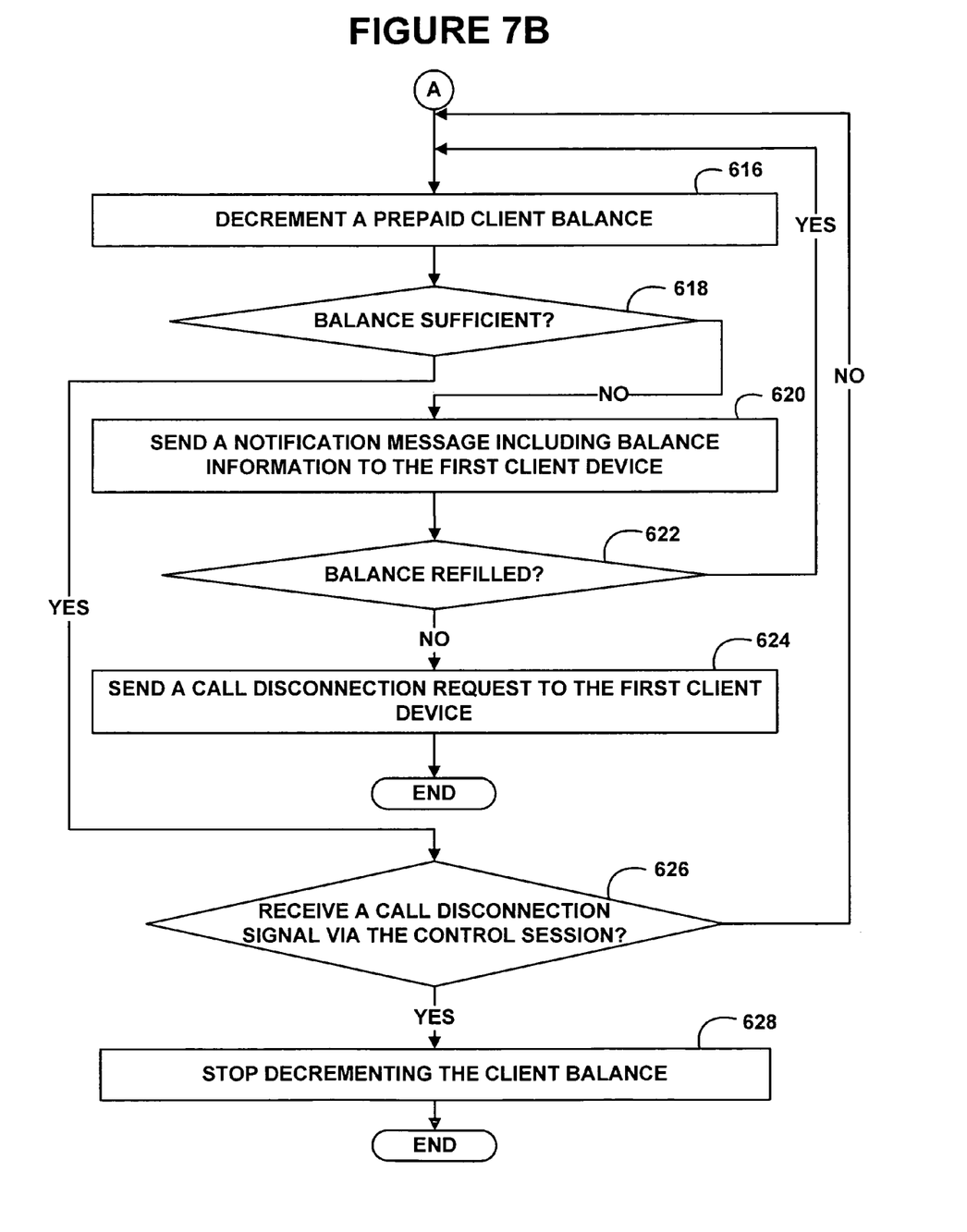

FIGS. 7A and 7B are a flow chart illustrating a method 600 for providing prepaid services for a client device, and method 600 is described in reference to a control network entity providing prepaid services according to the exemplary embodiment.

Referring to step 602, a control network entity establishes a control communication session with a first client device. As mentioned in reference to the preceding figure, the control communication session is a data session established between the first client device and the control network entity via a data network. At step 604, the control network entity receives a prepaid status request from the first client device via the control communication session. In one embodiment, the prepaid status request message may include digits dialed by a subscriber at the first client device, an identification of the first client device, or an identification of the subscriber.

At step 606, the control network entity determines a prepaid service status of the subscriber. In one embodiment, to do so, the control network entity may include or communicate with a database including subscriber profiles and subscriber account information profiles. Alternatively, the control network entity may communicate with a predetermined network entity arranged to store and provide subscriber account information. For example, the subscriber profile may include information that indicates whether the subscriber may receive prepaid services. Further, the subscriber account information profile may include the current balance left on the subscriber's account.

At step 608, the control network entity determines whether the subscriber is authorized to receive prepaid services. As described in reference to the preceding step, to do so, the control network entity may retrieve the subscriber account information from the internal/external database or communicate with another network entity. For example, the control network entity may determine if the subscriber is authorized to make the call by determining if a sufficient balance is available on the subscriber's account. As mentioned earlier, the control network entity may include a rating engine that may be arranged to use the destination identifier, such as a phone number dialed by the subscriber, to determine if the balance on the subscriber's account is sufficient to make the call.

If the control network entity determines that the subscriber is not authorized to use prepaid services, at step 610, the control network entity sends a prepaid service rejection message to the first client device. According to an exemplary embodiment, if the subscriber's account is insufficient to make the call, or the subscriber does not have an established prepaid account, the prepaid service rejection message may include instruction for the first client device to connect to a predetermined network entity, such as a web server, arranged to enable the subscriber to refill the existing subscriber account or to establish a new prepaid service account. According to FIG. 6A, when the control network entity sends the prepaid service rejection to the first client device, method 600 terminates.

Referring back to step 608, when the control network entity determines that the subscriber is authorized to receive prepaid services, at step 612, the control network entity sends a prepaid status response message to the first client device. The prepaid status response may include authorization information including a measure of the subscriber's current balance. Further, the status response message may include decrement rates determined at the control network entity based on the type of call being made from the first client device.

At step 614, the control network entity determines if the call has been connected between the first client device and the second client device. According to an exemplary embodiment, upon connecting the call, the first client device may send a call connected status message to the control server. Alternatively, the control network entity may be configured to employ a predetermined timer to determine the start of the call without receiving any notification messages from the first client device. For example, the control network entity may be configured with more than one timer that may be variable and provisioned on a service type basis. In such an embodiment, the control network entity may start a timer upon sending the prepaid status response message to the first client device and may initiate decrementing the subscriber's balance once the timer reaches a zero level.

Referring now to FIG. 7B, when the control network entity determines that the call has been connected, at step 616, the control network entity begins decrementing the time or value from a prepaid client balance. During the progress of the call, at step 618, the control network entity monitors the client balance to determine whether the balance is sufficient to continue the call.

If the control network entity determines that the balance is insufficient, at step 620, the control network entity sends to the first client device a notification message including the balance information for the subscriber. According to an exemplary embodiment, the control network entity may instruct another network entity, such as a media server, to play a warning message to the subscriber associated with the first client device. In such an embodiment, the media server may also query the subscriber whether the subscriber wishes to refill the subscriber's account. If so, the control network entity may redirect the subscriber to a predetermined network entity arranged to enable subscribers to refill their accounts.

At step 622, the control network entity determines whether the account balance has been refilled. According to an exemplary embodiment, the predetermined network entity may send a notification message to the control network entity, and the notification message may include information regarding the new balance deposited by the subscriber. If the account balance has been refilled, method 600 continues at step 616. If the account balance has not been refilled, at step 624, the control network entity sends a call disconnection request message to the first client device via the control communication session.

Additionally, when the control network entity determines that the account balance has reached a zero threshold level, and that the subscriber has not refilled the account balance, the control network entity may also instruct a predetermined network entity in the system, such as an HLR, to suspend the subscriber's authorization to use prepaid services. In such an embodiment, when the subscriber attempts to make a new call, the subscriber may be directed to contact a customer service or may be redirected to a web site for recharging. However, it should be understood that different embodiments are possible as well.

Referring back to step 618, when the control network entity determines that there is a sufficient balance on the subscriber's account, at step 626, the control network entity determines whether a call disconnect signal has been received from the first client device via the control communication session. If the call disconnect signal has not been received, the method continues at step 616. Otherwise, at step 628, the control network entity stops decrementing the client balance, and method 600 terminates.

As is known in the art, client terminals may lose the airlink interface connectivity to a BSC during the progress of the call. According to an exemplary embodiment, to avoid billing a subscriber for a call when the airlink connectivity is lost during the progress of the call, a client device may be arranged to periodically send a "keep alive" signal to control network entity 214 via the control communication link. In such an embodiment, control network entity 214 may be arranged to periodically determine whether the "keep alive" signals have been received from the client device. For example, control network entity 214 may be configured with a time out period during which control network entity 214 should be receiving the next "keep alive" signal from the client device. In such an embodiment, if control network entity 214 does not receive a next signal during that period, control network entity 214 may stop decrementing the subscriber's balance. It should be understood that the method for determining when to stop decrementing the subscriber's balance may be programmable so that, for instance, control network entity 214 may stop decrementing the subscriber's balance when it does not receive two consecutive or three consecutive "keep alive" signals. Different embodiments are possible as well.

Further, according to an exemplary embodiment, account balance application 402 on first client device 202 may be configured to detect a disconnection of a data session to control network entity 214. In one embodiment, first client device 202 may be arranged to employ a timeout value, and if a "keep alive" signal is not received at first client device 202 from control network entity 214 during the preprogrammed time period, first client device 202 may detect the disconnection of the data session. When client device 202 detects the disconnection of the data session, client device 202 may responsively terminate a voice communication session to second client device 226. Such an embodiment may prevent an unauthorized user from stopping a data communication session and engaging in a free voice communication session.

It will be apparent to those of ordinary skill in the art that methods involved in the system and methods for prepaid supported communications may be embodied in a computer program product that includes one or more computer readable media. For example, a computer readable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

Further, those skilled in the art will appreciate that many of the elements described in embodiments of the present invention are functional entities that may be implemented as discrete components or in conjunction with other components, in any suitable combination and location. Still further, various functions described herein as being performed by one or more entities may be carried out by one or more processors programmed to execute an appropriate set of computer instructions stored in memory. Provided with the present disclosure, those skilled in the art can readily prepare the appropriate set of computer instructions to perform the various functions.

Exemplary embodiments of the present invention have been described above. Those skilled in the art will understand, however, that changes and modifications may be made to these embodiments without departing from the true scope and spirit of the present invention, which is defined by the claims.

What is claimed:

1. A method comprising:
    receiving into an account balance service logic module within a client telephony device a user-request to place a voice call from the client telephony device;
    responsively sending from the client telephony device to a controller, via a packet-data connection, a request for authorization to place the voice call;
    receiving into a voice call logic module within the client telephony device from the controller, via the packet-data connection, a response to the request; and
    sending from the client telephony device to a network entity a call origination request message seeking to initiate the voice call, only if the response indicates that the client telephony device is authorized to place the voice call.

2. The method of claim 1, further comprising:
upon establishment of the voice call, sending from the client telephony device to the controller, via the packet-data connection, a call-connected message.

3. The method of claim 2, further comprising, at the client telephony device:
during the voice call, receiving from the controller, via the packet-data connection, a call-disconnect message instructing the client telephony device to disconnect the voice call; and
responsively disconnecting the voice call.

4. The method of claim 2, further comprising:
during the voice call, receiving from the controller, via the packet-data connection, a notification message indicating account balance information.

5. The method of claim 1, further comprising, at the controller:
generating the response to the request, based on an evaluation of a prepaid account balance.

6. The method of claim 5, wherein generating the response to the request based on the evaluation of the prepaid account balance comprises:
indicating in the response that the client telephony station is authorized to place the voice call, only if the prepaid account balance is sufficient.

7. The method of claim 5, further comprising:
upon establishment of the voice call, sending from the client telephony device to the controller, via the packet-data connection, a call-connected message.

8. The method of claim 7, further comprising, at the controller:
receiving the call-connected message; and
monitoring the prepaid account balance during the voice call.

9. The method of claim 8, further comprising, at the controller:
determining that the prepaid account balance has reached a low threshold level, and responsively sending from the controller to the client telephony device, via the packet-data connection, an instruction for the client telephony device to disconnect the voice call.

10. The method of claim 5, further comprising, at the controller:
decrementing the account balance during the voice call.

11. The method of claim 10, further comprising, at the controller:
receiving an end-of-call message from the client telephony device, via the packet-data connection; and
responsively discontinuing the decrementing of the account balance.

12. The method of claim 1, further comprising, at the client telephony device:
detecting disconnection of the packet-data connection; and
responsively disconnecting the voice call.

13. The method of claim 1, wherein the client telephony device comprises a cellular wireless telephone.

14. A method comprising:
receiving into an account balance service logic module within a client telephony device a user-request to place a voice call from the client telephony device;
responsively sending from the client telephony device to a controller, via a packet-data connection, a request for authorization to place the voice call;
generating a response to the request at the controller, based on an evaluation of an account balance, and sending the response to the client telephony device via the packet-data connection;
sending from a voice call logic module within the client telephony device to a network entity a call origination request message seeking to initiate the voice call, only if the response indicates that the client telephony device is authorized to place the voice call;
upon establishment of the voice call, sending from the client telephony device to the controller, via the packet-data connection, a call-connected message;
decrementing and monitoring the account balance at the controller, during the voice call; and
detecting that the account balance has reached a low threshold level and responsively sending from the controller to the client telephony device, via the packet-data connection, an instruction for the client telephony device to disconnect the voice call,
wherein the client telephony device disconnects the voice call in response to the instruction.

15. The method of claim 14, wherein the client telephony device comprises a cellular wireless telephone.

16. A system comprising:
a client telephony device;
a network controller;
wherein the client telephony device is arranged to receive within an account balance service logic module a user-request to place a voice call from the client telephony device and to responsively send to the controller, via a packet-data connection, a request for authorization to place the voice call;
wherein the controller is arranged to generate a response to the request for authorization, based on an evaluation of an account balance, and to send the response to the client telephony device via the packet-data connection; and
wherein a voice call logic module within the client telephony device is arranged to send to a network entity a call origination request message seeking to initiate the voice call, only if the response indicates that the client telephony device is authorized to place the voice call.

17. The system of claim 16,
wherein the controller is arranged to decrement and monitor the account balance during the voice call.

18. The system of claim 17,
wherein the controller is arranged to detect when the account balance has reached a low threshold level and to responsively send to the client telephony device, via the packet-data connection, an instruction for the client telephony device to disconnect the voice call; and
wherein the client telephony device is arranged to disconnect the voice call in response to the instruction.

19. The system of claim 18,
wherein the client telephony device comprises a cellular wireless telephone.

20. The system of claim 18,
wherein the client telephony device is further arranged to detect disconnection of the packet-data connection and to responsively disconnect the voice call.

* * * * *